United States Patent
Oguma et al.

(10) Patent No.: US 11,121,386 B2
(45) Date of Patent: Sep. 14, 2021

(54) TEMPERATURE ESTIMATING APPARATUS

(71) Applicant: TOYOTA JIDOSHA KABUSHIKI KAISHA, Toyota (JP)

(72) Inventors: Yasumasa Oguma, Nagaizumi-cho (JP); Tetsuya Osaka, Tokyo (JP); Shingo Tsuda, Tokyo (JP); Kazuaki Utsumi, Tokyo (JP); Tokihiko Yokoshima, Tokyo (JP); Daikichi Mukoyama, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 496 days.

(21) Appl. No.: 16/107,221

(22) Filed: Aug. 21, 2018

(65) Prior Publication Data
US 2019/0067714 A1 Feb. 28, 2019

(30) Foreign Application Priority Data
Aug. 24, 2017 (JP) .............................. JP2017-161219

(51) Int. Cl.
*H01M 8/0432* (2016.01)
*H01M 8/04537* (2016.01)
(Continued)

(52) U.S. Cl.
CPC ............ *H01M 8/0432* (2013.01); *G01K 7/16* (2013.01); *G01K 11/00* (2013.01);
(Continued)

(58) Field of Classification Search
CPC ............ G01K 11/00; G01K 2205/00; G01K 2217/00; G01K 7/16; H01M 10/0525;
(Continued)

(56) References Cited

U.S. PATENT DOCUMENTS 4,302,731 A * 11/1981 Ashida .................... H03L 1/023
                                                          331/116 R
4,985,687 A *  1/1991 Long ........................ H03L 1/04
                                                          219/210
(Continued)

FOREIGN PATENT DOCUMENTS

CN    106289566 A    1/2017
JP    9-117001 A     5/1997
(Continued)

OTHER PUBLICATIONS

Office Action dated Dec. 3, 2020 in U.S. Appl. No. 16/101,592.
(Continued)

*Primary Examiner* — Jeffrey P Aiello
(74) *Attorney, Agent, or Firm* — Sughrue Mion, PLLC

(57) ABSTRACT

A temperature estimating apparatus is provided with: a deriving device configured to derive a slope function, on the basis of a value of a complex impedance of a battery at a predetermined frequency out of values obtained at a plurality of different temperatures and on the basis of a temperature of the battery when the complex impedance is obtained, wherein the slope function indicates a relation between the value of the complex impedance at the predetermined frequency and an inverse of the temperature of the battery; and an estimator configured (i) to measure a value of the complex impedance at the predetermined frequency and (ii) to substitute the measured value of the complex impedance at the predetermined frequency into the slope function, thereby estimating a temperature of the battery when the value of the complex impedance is measured.

4 Claims, 9 Drawing Sheets

(51) Int. Cl.
*G01K 7/16* (2006.01)
*G01K 11/00* (2006.01)
*H01M 10/48* (2006.01)
*H01M 10/0525* (2010.01)

(52) U.S. Cl.
CPC ..... *H01M 8/04634* (2013.01); *H01M 10/486* (2013.01); *G01K 2205/00* (2013.01); *G01K 2217/00* (2013.01); *H01M 10/0525* (2013.01); *H01M 2220/20* (2013.01)

(58) Field of Classification Search
CPC ........... H01M 10/486; H01M 2220/20; H01M 8/0432; H01M 8/04634; G01R 31/367; G01R 31/389; G01R 31/3842
USPC ..... 324/426–430; 374/1, E15.001; 701/32.9, 701/34.4; 702/63–65, 134–136, 199; 703/13, 18
See application file for complete search history.

(56) References Cited

U.S. PATENT DOCUMENTS

| | | | | |
|---|---|---|---|---|
| 5,231,880 A | * | 8/1993 | Ward | G01L 9/0022 310/338 |
| 5,570,304 A | * | 10/1996 | Mark | G01C 21/16 703/7 |
| 5,785,064 A | * | 7/1998 | Simpson | A45D 1/28 116/216 |
| 5,859,537 A | * | 1/1999 | Davis | G01N 17/02 324/693 |
| 5,883,550 A | * | 3/1999 | Watanabe | H03B 5/32 331/176 |
| 2011/0301931 A1 | * | 12/2011 | Gering | G01R 31/392 703/13 |
| 2012/0099618 A1 | | 4/2012 | Nishi et al. | |
| 2012/0256569 A1 | * | 10/2012 | Kawahara | H01M 10/6563 318/139 |
| 2013/0156072 A1 | | 6/2013 | Hebiguchi | |
| 2014/0229130 A1 | | 8/2014 | Koba et al. | |
| 2016/0103184 A1 | | 4/2016 | Kawai et al. | |
| 2016/0131719 A1 | * | 5/2016 | Takahashi | G01R 31/392 324/430 |
| 2016/0187429 A1 | | 6/2016 | Kawai et al. | |
| 2016/0195577 A1 | | 7/2016 | Osaka et al. | |
| 2018/0156872 A1 | | 6/2018 | Oguma et al. | |
| 2019/0064278 A1 | | 2/2019 | Oguma et al. | |

FOREIGN PATENT DOCUMENTS

| | | |
|---|---|---|
| JP | 3642092 B2 | 4/2005 |
| JP | 2006-250905 A | 9/2006 |
| JP | 2008-157757 A | 7/2008 |
| JP | 2011-018532 A | 1/2011 |
| JP | 2013-101884 A | 5/2013 |
| JP | 2013-143308 A | 7/2013 |
| JP | 2014-126532 A | 7/2014 |
| JP | 2016-065831 A | 4/2016 |
| JP | 2018-91716 A | 6/2018 |
| WO | 2013/018641 A1 | 2/2013 |
| WO | 2013/114669 A1 | 8/2013 |

OTHER PUBLICATIONS

Jiuchun Jiang et al., "A reduced low-temperature electro-thermal coupled model for lithium-ion batteries", Applied Energy, Jun. 13, 2016, vol. 177, pp. 804-816 (13 pages total).
An Office Action dated Jun. 1, 2020, which issued during the prosecution of U.S. Appl. No. 16/101,592.
Advisory Action dated May 18, 2021 in U.S. Appl. No. 16/101,592.
Office Action dated Jun. 24, 2021 from the U.S. Patent and Trademark Office in U.S. Appl. No. 16/101,592.

* cited by examiner

TEMPERATURE ESTIMATING APPARATUS

CROSS-REFERENCE TO RELATED APPLICATIONS

This application is based upon and claims the benefit of priority of the prior Japanese Patent Application No. 2017-161219, filed on Aug. 24, 2017, the entire contents of which are incorporated herein by reference.

BACKGROUND

1. Technical Field

Embodiments of the present disclosure relate to a temperature estimating apparatus configured to estimate a temperature of a battery mounted on a vehicle or the like.

2. Description of the Related Art

For this type of apparatus, for example, there is known an apparatus configured to estimate a temperature of a battery from an impedance of the battery. For example, International Publication No. WO2013/114669 (Patent Literature 1) discloses an apparatus configured to estimate the temperature of the battery by using correlation data, which indicates a correlation among the temperature of the battery, a negative electrode electricity amount, and a characteristic amount corresponding to a local maximum value of an absolute value of an imaginary component of an alternating current (AC) impedance. Japanese Patent Application Laid Open No. 2014-126532 (Patent Literature 2) discloses that the temperature of the battery is estimated by using a relation between the temperature of the battery and the AC impedance at a ripple frequency. International Publication No. WO2013/018641 (Patent Literature 3) discloses that a heating amount of the battery is calculated on the basis of an internal resistance of the battery obtained from an internal resistance map.

Moreover, as another method of estimating the temperature of the battery, Japanese Patent Application Laid Open No. 2008-157757 (Patent Literature 4) discloses that a first temperature change function, which indicates a temperature change detected when the battery is cooled by a cooling apparatus, and a second temperature change function, which indicates a temperature change of the battery in the cooling based on a cooling capability of the cooling apparatus, are calculated and that a difference between the first temperature change function and the second temperature change function, or the like, is used to estimate the temperature of the battery.

According to the technologies/techniques disclosed in the aforementioned Patent Literatures 1 to 3, it is possible to estimate the temperature of the battery without using a temperature sensor, which uses, for example, a thermocouple. The technologies/techniques, however, have such a technical problem that a relatively advanced and complicated arithmetic operation is required, or similar problems, and there remains room for improvement.

SUMMARY

In view of the aforementioned problems, it is therefore an object of embodiments of the present disclosure to provide a temperature estimating apparatus configured to easily and accurately estimate the temperature of the battery.

The above object of embodiments of the present disclosure can be achieved by a temperature estimating apparatus provided with: a deriving device configured to derive a slope function, on the basis of a value of a complex impedance of a battery at a predetermined frequency out of values obtained at a plurality of different temperatures and on the basis of a temperature of the battery when the complex impedance is obtained, wherein the slope function indicates a relation between the value of the complex impedance at the predetermined frequency and an inverse of the temperature of the battery; and an estimator configured (i) to measure a value of the complex impedance at the predetermined frequency and (ii) to substitute the measured value of the complex impedance at the predetermined frequency into the slope function, thereby estimating a temperature of the battery when the value of the complex impedance is measured.

DETAILED DESCRIPTION OF THE EMBODIMENTS

A temperature estimating apparatus according to embodiments of the present disclosure will be explained with reference to the drawings. The following is an example in which the temperature estimating apparatus is configured to estimate a temperature of a battery of a vehicle.

(1) Configuration of Apparatus

Figure 1:
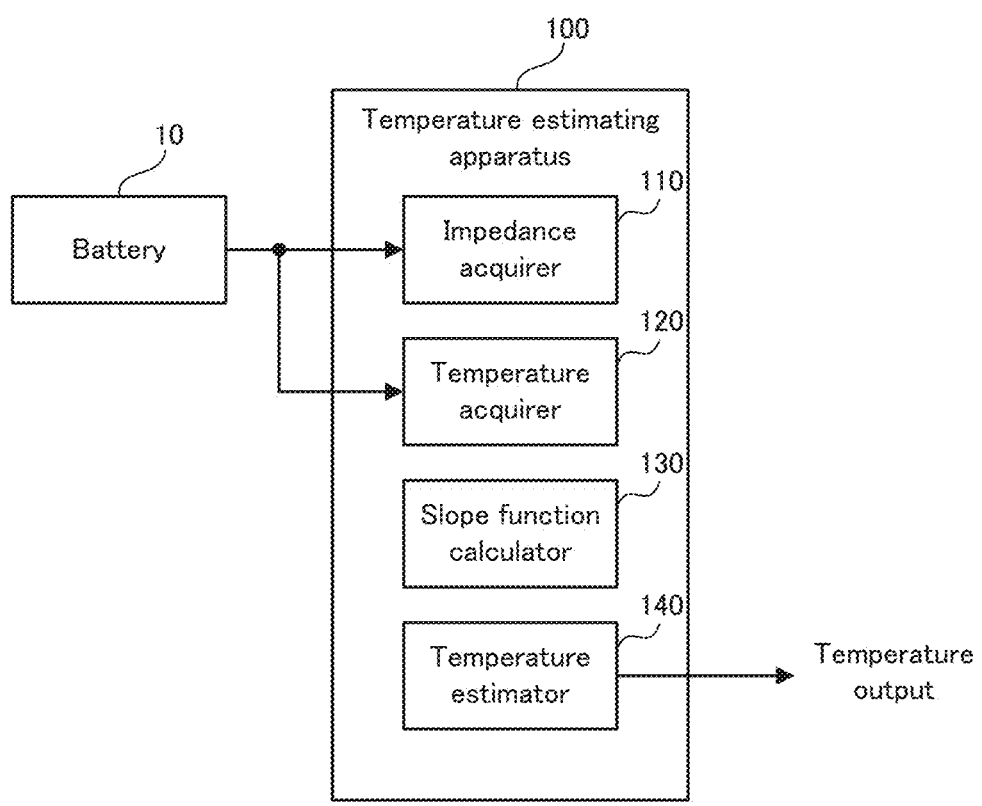
FIG. 1 is a block diagram illustrating a configuration of a temperature estimating apparatus according to an embodiment.

Firstly, a configuration of a temperature estimating apparatus 100 according to an embodiment will be explained with reference to FIG. 1. FIG. 1 is a block diagram illustrating the configuration of the temperature estimating apparatus 100 according to the embodiment.

As illustrated in FIG. 1, the temperature estimating apparatus 100 according to the embodiment is an electronic unit electrically connected to a battery 10 of the vehicle, and is configured to estimate the temperature of the battery 10. The battery 10 is a specific example of the "battery" in Supplementary Note described later, and is configured as a chargeable aqueous secondary battery, such as, for example, a lithium ion battery.

The temperature estimating apparatus 100 is provided with an impedance acquirer 110, a temperature acquirer 120, a slope function calculator 130, and a temperature estimator 140, as logical or physical processing blocks realized therein.

The impedance acquirer 110 is configured to obtain a complex impedance of the battery 10. The impedance acquirer 110 is configured to obtain the complex impedance, for example, by applying an alternating current (AC) voltage to the battery 10 while changing a frequency. A method of obtaining the complex impedance can use the exiting technique/technology, as occasion demands, and a detailed explanation herein will be thus omitted. The complex impedance of the battery 10 obtained by the impedance acquirer 110 may be outputted to the slope function calculator 130 and the temperature estimator 140.

The temperature acquirer 120 is configured to obtain a temperature of the battery 10, or preferably, a temperature of an electrode. The temperature acquirer 120 is particularly configured to obtain the temperature when the impedance acquirer 110 obtains the complex impedance of the battery 10. The temperature acquirer 120 may include a temperature sensor or the like, which uses, for example, a thermocouple. The temperature obtained by the temperature acquirer 120, however, may not be directly used when the temperature is estimated by the temperature estimator 140 described later. The temperature of the battery 10 obtained by the temperature acquirer 120 may be outputted to the slope function calculator 130.

The slope function calculator 130 is a specific example of the "deriving device" in Supplementary Notes described later, and is configured to derive a slope function indicating a relation between the complex impedance of the battery 10 obtained by the impedance acquirer 110 and the temperature of the battery 10 obtained by the temperature acquirer 120. The slope function, which will be detailed later, is a function indicating that the complex impedance of the battery 10 and an inverse of the temperature of the battery 10 are in a linear relation. The slope function calculated by the slope function calculator 130 may be outputted to the temperature estimator 140.

The temperature estimator 140 is a specific example of the "estimator" in Supplementary Notes described later, and is configured to estimate the temperature of the battery when the complex impedance is measured, from the complex impedance of the battery 10, by using the slope function calculated by the slope function calculator 130. A value indicating the temperature of the battery 10 estimated by the temperature estimator 140 may be outputted to the exterior of the apparatus, and may be used, for example, as a parameter for estimating a current state of the battery 10.

(2) Temperature Dependence of Complex Impedance and Problems

Figure 2:
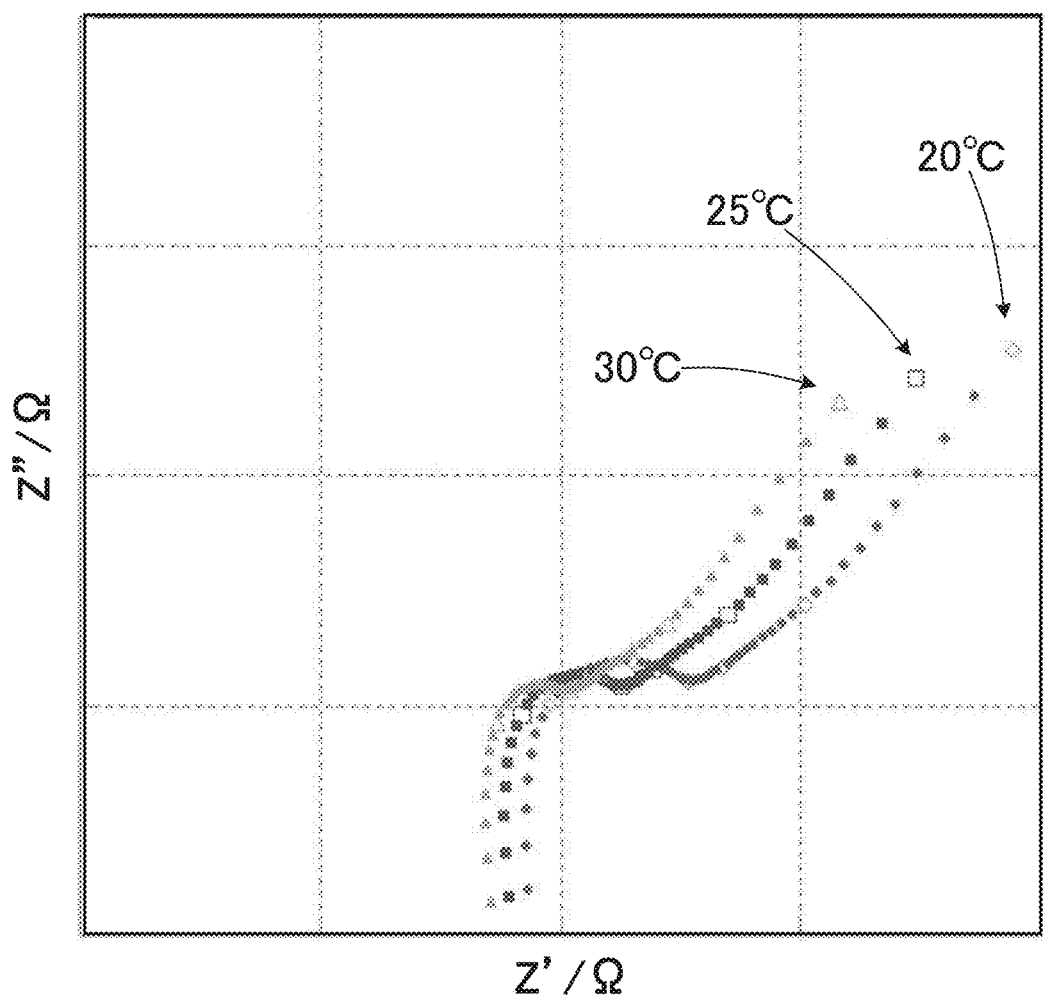
FIG. 2 is a graph illustrating waveforms of complex impedances measured at 20 degrees C., 25 degrees C., and 30 degrees C.
Figure 3:
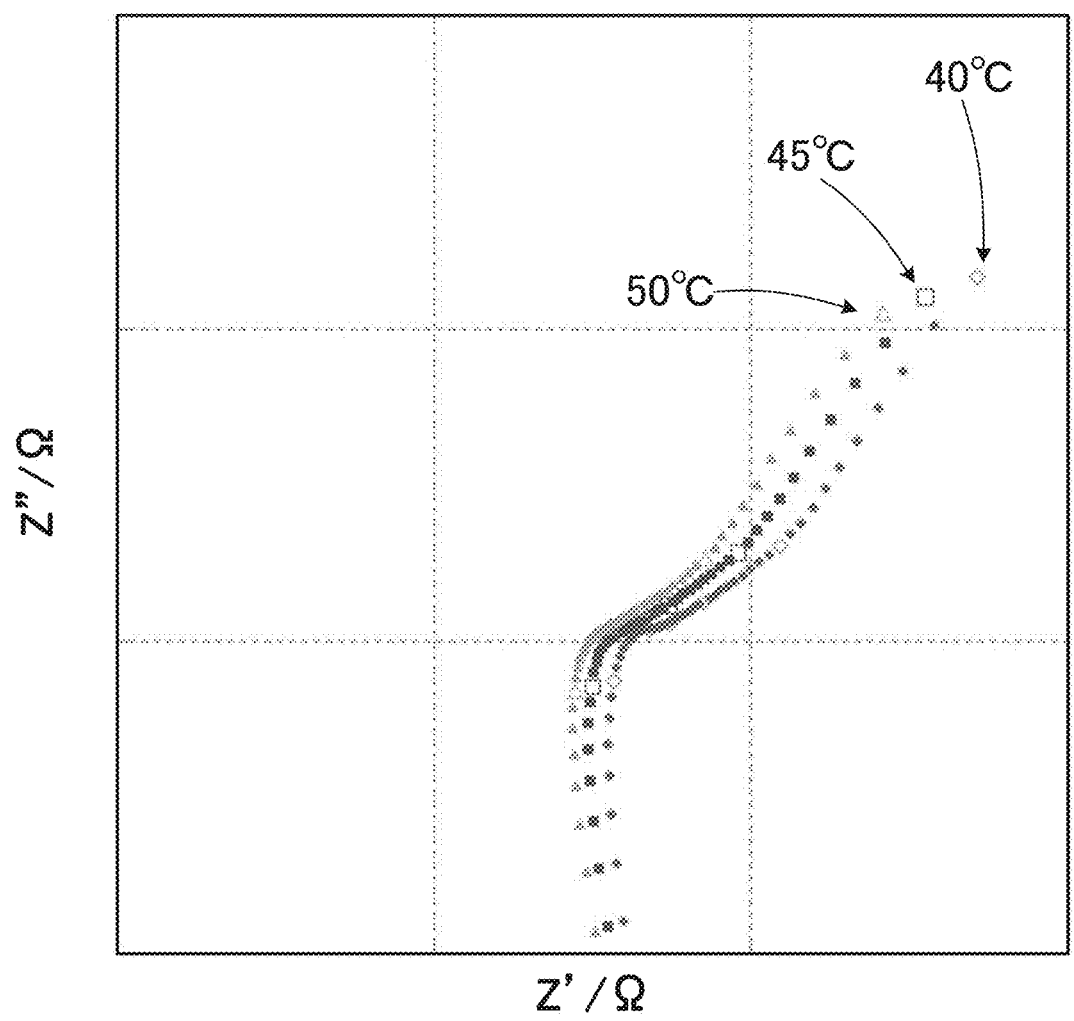
FIG. 3 is a graph illustrating waveforms of the complex impedances measured at 40 degrees C., 45 degrees C., and 50 degrees C.

Next, a temperature dependence of the complex impedance of the battery 10 will be explained with reference to FIG. 2 and FIG. 3. FIG. 2 is a graph illustrating waveforms of complex impedances measured at 20 degrees C., 25 degrees C., and 30 degrees C. FIG. 3 is a graph illustrating waveforms of the complex impedances measured at 40 degrees C., 45 degrees C., and 50 degrees C. Data illustrated in FIG. 2 and FIG. 3 is measured when the battery 10 has a SOC of 95%.

As illustrated in FIG. 2 and FIG. 3, when complex impedances obtained at temperatures of the battery 10 of 20 degrees C., 25 degrees C., and 30 degrees C. and 40 degrees C., 45 degrees C., and 50 degrees C. are plotted on a complex plane, the complex impedances are drawn as different curves that are shifted to the right side with decreasing temperature. This indicates that the complex impedance of the battery 10 has a significant temperature dependence. The temperature dependence of the complex impedance is caused by diffusion of lithium ions and charge transfer inside the battery 10.

As described above, the complex impedance of the battery 10 significantly varies depending on the temperature of the battery 10 when measured. Thus, if a correlation between the temperature and the complex impedance of the battery 10 is accurately known in advance, the temperature can be estimated from the complex impedance. In order to examine the relation between the complex impedance and the temperature, however, a relatively complicated process is required, such as isolating a plurality of resistance components of the battery 10 by using, e.g., fitting analysis or the like, and it is extremely hard to establish a system installed in the vehicle 10 by using the existing technologies/techniques.

The temperature of the battery 10 can be measured by the temperature sensor, which uses, for example, the thermocouple. The battery 10 in operation, however, may have a variation in internal temperature, and the temperature to be measured, which is specifically the temperature of the electrode, cannot be accurately measured in some cases. In other words, there may be a deviation between the temperature measured by the temperature sensor and the actual temperature of the electrode of the battery 10.

The temperature estimating apparatus 100 according to the embodiment is configured to perform operations detailed below, to solve the aforementioned problems.

(3) Derivation of Slope Function

Figure 4:
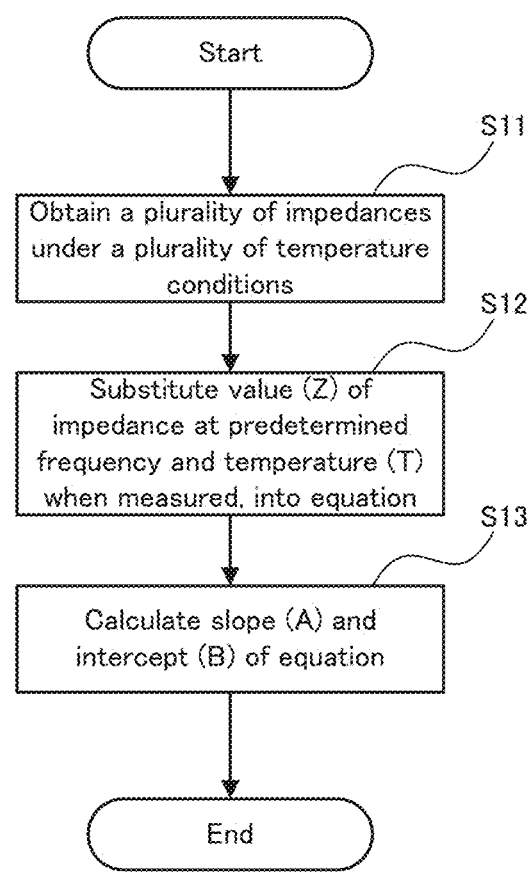
FIG. 4 is a flowchart illustrating a flow of a slope function derivation process performed by the temperature estimating apparatus according to the embodiment.

A slope function derivation process, which is a process of deriving the slope function and which is performed by the temperature estimating apparatus 100 according to the embodiment, will be explained with reference to FIG. 4. FIG. 4 is a flowchart illustrating a flow of the slope function derivation process performed by the temperature estimating apparatus according to the embodiment.

In FIG. 4, the temperature estimating apparatus 100 according to the embodiment performs the process of deriving the slope function, i.e., a function for estimating the temperature of the battery 10, before estimating the temperature of the battery 10. Specifically, a plurality of complex impedances are firstly obtained under a plurality of temperature conditions (step S11). More specifically, a complex impedance of the battery 10 is obtained by the impedance acquirer 110, and a temperature of the battery 10 at that time may be obtained by the temperature acquirer 120.

The obtained complex impedances of the battery 10 can be divided by each frequency. In the following process, complex impedances at a predetermined frequency may be obtained under the plurality of temperature conditions. In this case, an absolute value, a real component (i.e., a real part), and an imaginary component (i.e., an imaginary part) are obtained for the complex impedances at the predetermined frequency. The "predetermined frequency" here is a frequency corresponding to a slope component of Cole-Cole plotted complex impedances (i.e., a straight line part in FIG. 2 and FIG. 3).

The obtained complex impedances of the battery 10 (whose values will be hereinafter expressed as Z0) and the temperatures of the battery 10 (whose values will be hereinafter expressed as T0) when the corresponding complex impedances are obtained may be inputted to the slope function calculator 130, so that a slope function for estimating the complex impedance may be derived. The slope function calculator 130 substitutes the values Z0 of the complex impedances at the predetermined frequency of the battery 10 and the temperatures T0 of the battery 10 when the corresponding complex impedances are obtained, into a numerical expression stored in advance (i.e., a numerical equation (1) described below) (step S12).

According to studies by the present inventors, it has been found that a relation of the following equation (1) is established between a value Z of the complex impedance at the predetermined frequency and a temperature T of the battery 10.

$$\log Z = A \times (1/T) + B \quad (1)$$

Thus, if a slope A and an intercept B are obtained after the temperatures T0 and the values Z0 of the complex impedance of the battery 10 actually obtained are substituted into the equation (1) (step S13), it is possible to derive a slope function indicating the relation between the temperature T and the value Z of the complex impedance of the battery 10.

The slope function may be used to estimate an accurate temperature of the battery 10, as described later. Thus, data obtained in the calculation of the slope function, i.e., the values Z0 of the complex impedances and the temperatures T0 of the battery 10 when the corresponding complex impedances are measured, is measured at a temperature at which measurement accuracy is at least partially ensured. The "temperature at which the measurement accuracy is ensured" is a temperature of the battery 10 corresponding to a situation in which an event that causes a reduction in the measurement accuracy unlikely occurs.

For example, the battery 10 may have a variation in internal temperature due to a temperature change, and the temperature T cannot be accurately measured in some cases. Thus, if data measured in this situation is used, it is hardly possible to accurately derive the slope function. Therefore, if the slope function is derived, data measured in a situation in which there is no variation in internal temperature of the battery 10 may be at least partially used. An example of the situation in which there is no variation in internal temperature of the battery 10 is immediately after the start of the vehicle on which the battery 10 is mounted. Thus, the data for calculating the slope function is preferably measured immediately after the start of the vehicle, or in similar occasions.

Figure 5:
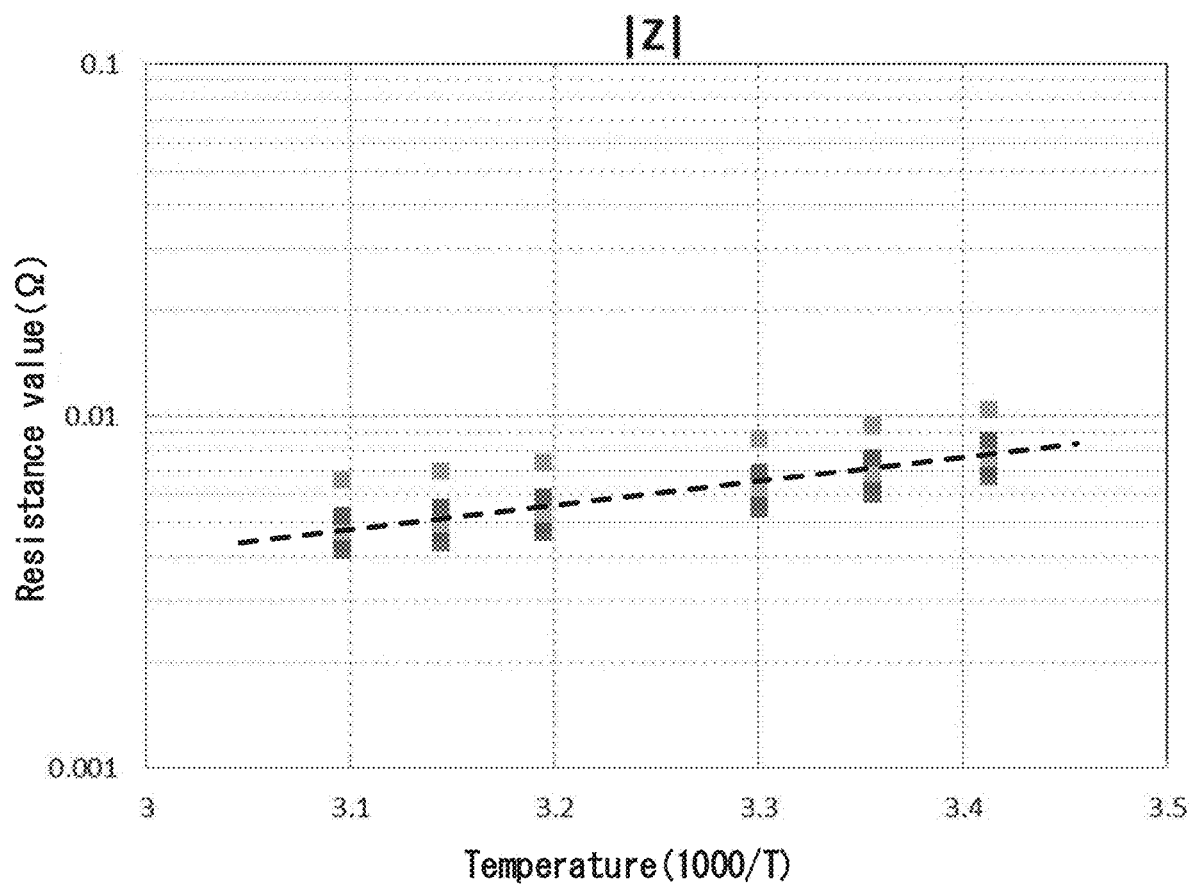
FIG. 5 is a graph illustrating a relation between an absolute value of the complex impedance and an inverse of temperature.
Figure 6:
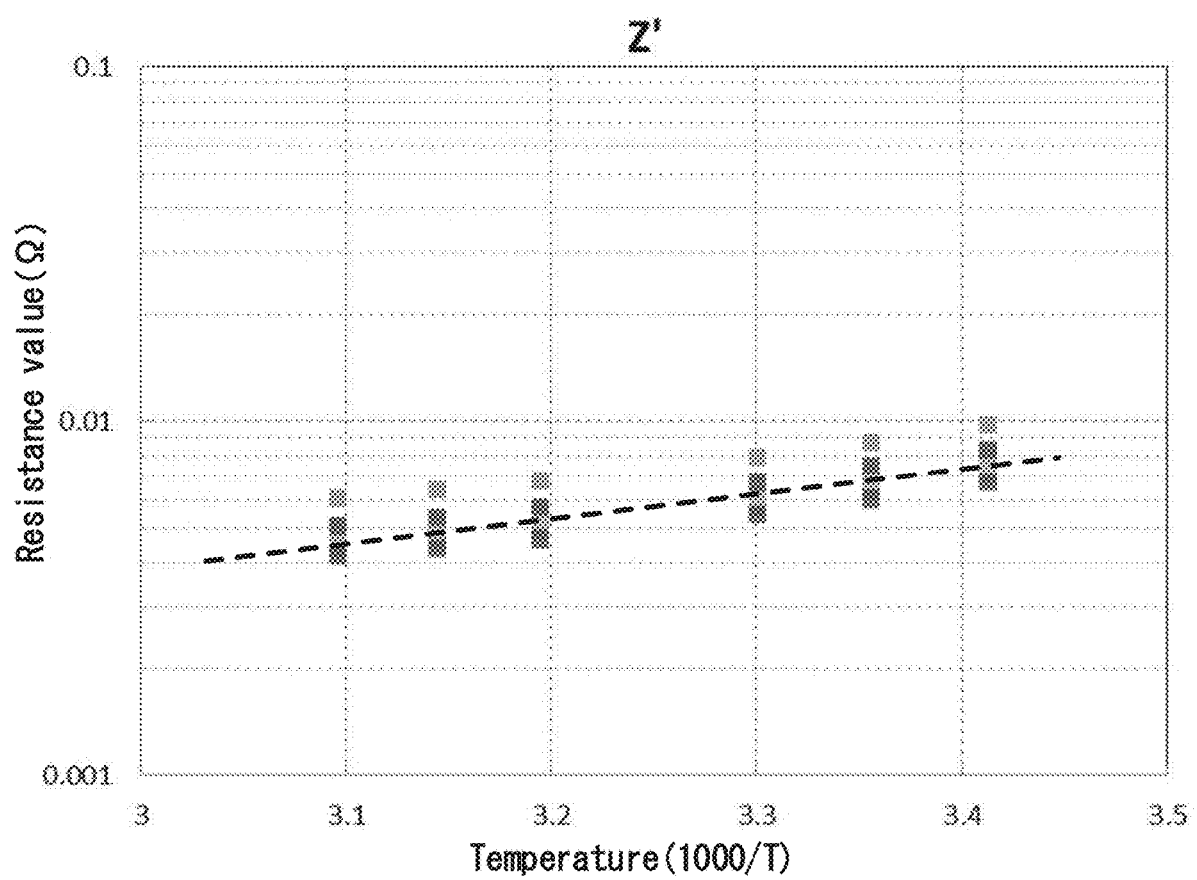
FIG. 6 is a graph illustrating a relation between a real component of the complex impedance and the inverse of the temperature.
Figure 7:
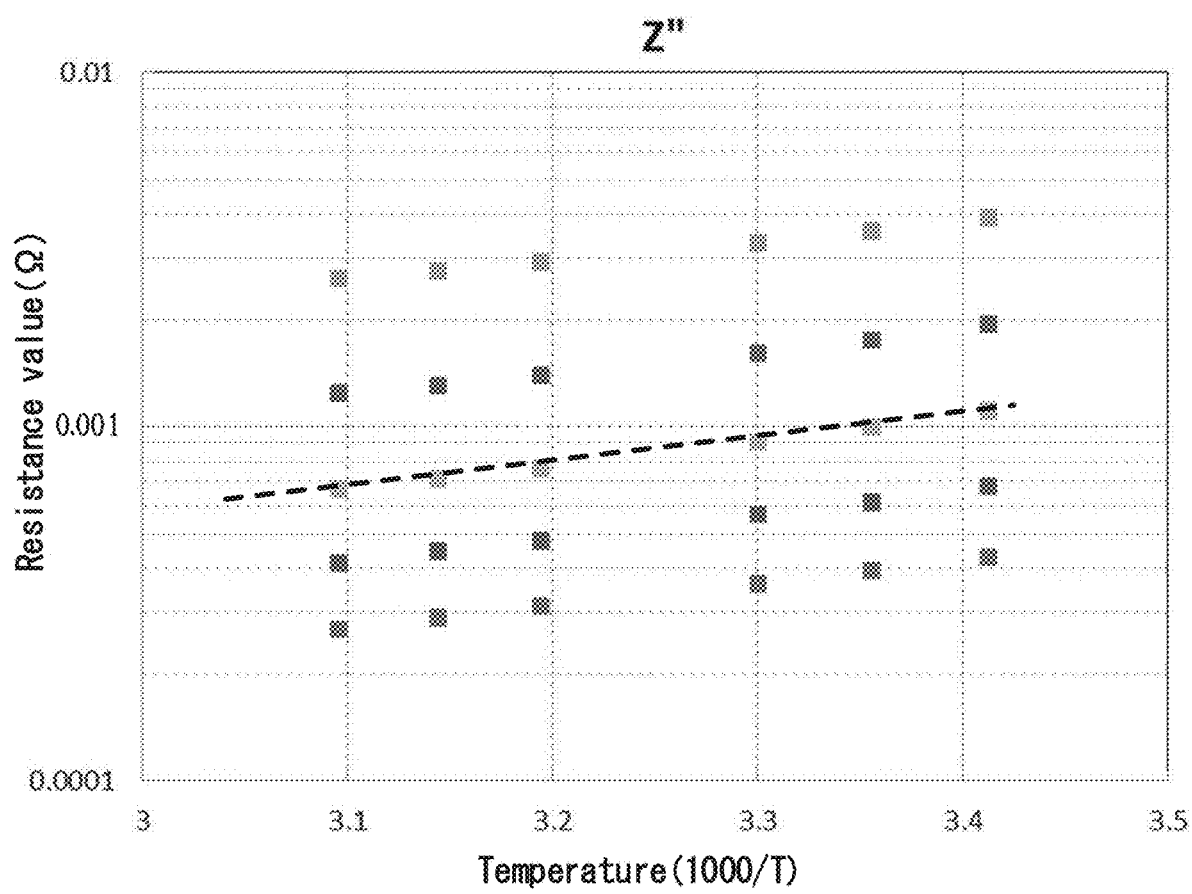
FIG. 7 is a graph illustrating a relation between an imaginary component of the complex impedance and the inverse of the temperature.
Figure 8:
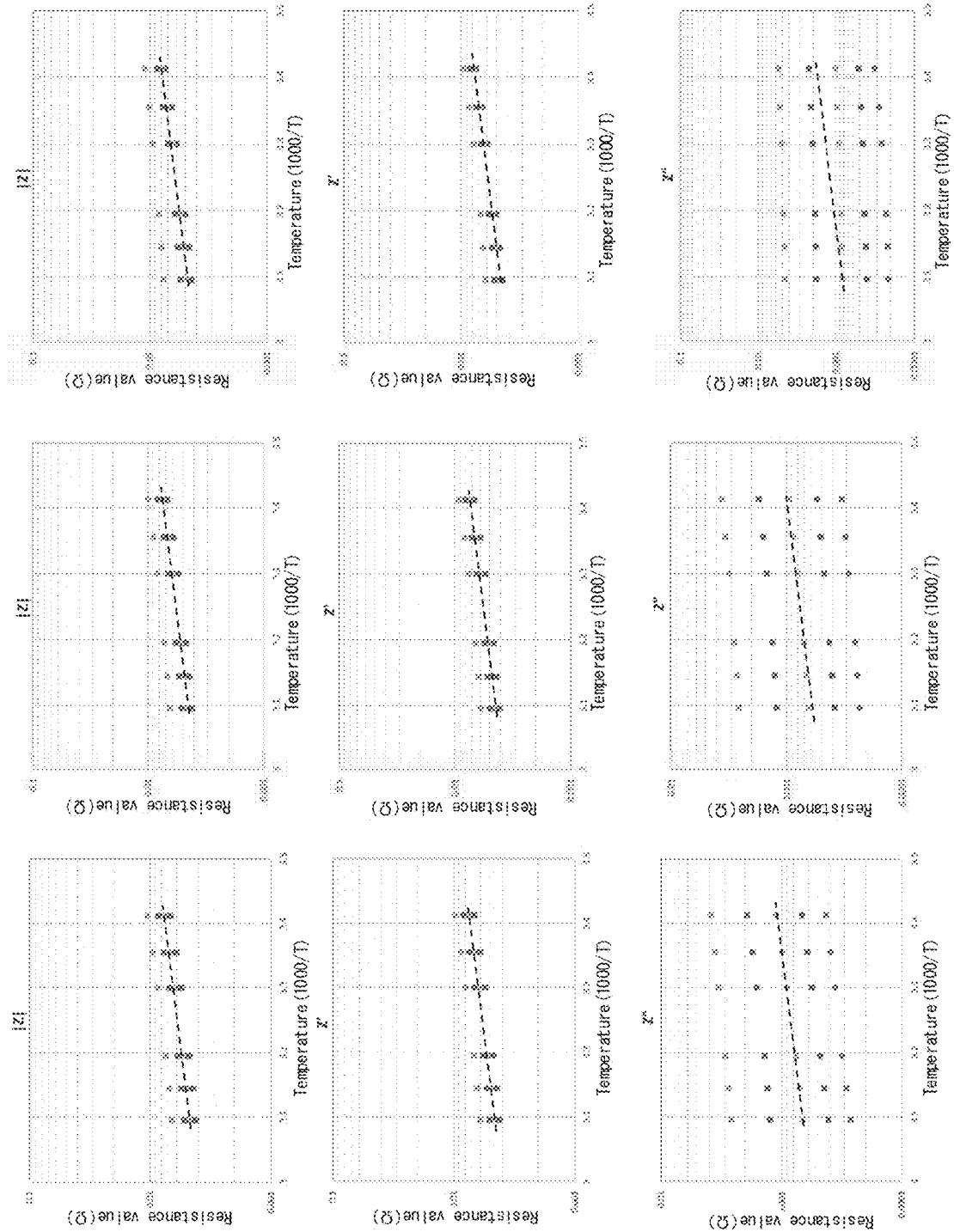
FIG. 8 is graphs respectively illustrating relations between values of the complex impedances measured in different SOCs and the inverses of the temperatures.

Next, a more specific method of deriving the slope function will be explained with reference to FIG. 5 to FIG. 8. FIG. 5 is a graph illustrating a relation between an absolute value of the complex impedance and an inverse of the temperature. FIG. 6 is a graph illustrating a relation between a real component of the complex impedance and the inverse of the temperature. FIG. 7 is a graph illustrating a relation between an imaginary component of the complex impedance and the inverse of the temperature. FIG. 8 is graphs respectively illustrating relations between values of the complex impedances measured in different SOCs and the inverses of the temperatures. A numerical value on a horizontal axis in each of FIG. 5 to FIG. 8 is a numerical value when the temperature T is measured by the absolute temperature.

As illustrated in FIG. 5 to FIG. 7, a plurality of types of slope functions are derived by using an absolute value $|Z|$, a real component $Z'$, and an imaginary component $Z''$ for the complex impedances. In other words, a slope function indicating a relation between the absolute value $|Z|$ and the temperature T, a slope function indicating a relation between the real component $Z'$ and the temperature T, and a slope function indicating a relation between the imaginary component $Z''$ and the temperature T are separately derived. The slope function may be not always derived for all the absolute value $|Z|$, the real component $Z'$, and the imaginary component $Z''$, and the slope function may be derived for at least one of the absolute value $|Z|$, the real component $Z'$, and the imaginary component $Z''$.

In FIG. 5, the absolute value $|Z|$ for the complex impedances measured in a range in which the temperature T of the battery 10 is 20 to 50 degrees C. changes linearly with respect to a variation in the temperature T. Specifically, connecting points corresponding to the same frequency provides a straight line (refer to a dashed line in FIG. 5). As described above, if the absolute value $|Z|$ of the complex impedance and the temperature T when the value is obtained are used and plotted to obtain an approximate straight line, which connects plotted points, it is possible to derive the slope function indicating the relation between the absolute value $|Z|$ of the complex impedance and the temperature T.

In FIG. 6, the real component $Z'$ for the complex impedances measured in the range in which the temperature T of the battery 10 is 20 to 50 degrees C. also changes linearly with respect to the variation in the temperature T, as in the absolute value $|Z|$ illustrated in FIG. 5. Thus, if the real component $Z'$ of the complex impedance and the temperature T when a value of the real component $Z'$ is obtained are used and plotted to obtain an approximate straight line, which connects plotted points, it is possible to derive the slope function indicating the relation between the real component $Z'$ of the complex impedance and the temperature T.

In FIG. 7, the imaginary component $Z''$ for the complex impedances measured in the range in which the temperature T of the battery 10 is 20 to 50 degrees C. also changes linearly with respect to the variation in the temperature T, as in the absolute value $|Z|$ illustrated in FIG. 5 and the real component $Z'$ illustrated in FIG. 6. Thus, if the imaginary component $Z''$ of the complex impedance and the temperature T when a value of the imaginary component $Z''$ is obtained are used and plotted to obtain an approximate straight line, which connects plotted points, it is possible to derive the slope function indicating the relation between the imaginary component $Z''$ of the complex impedance and the temperature T.

In FIG. 8, straight lines corresponding to the same slope function are overlapped on graphs obtained when the temperatures T0 and the values Z0 of the complex impedances of the battery 10 are obtained in different SOCs (i.e., 95%, 60%, 10%). As can be seen, a plurality of points corresponding to the same frequency are connected by a straight line on each of the graphs of the absolute value $|Z|$, the real component $Z'$, and the imaginary component $Z''$. This indicates that the same slope function is derived in each of the absolute value $|Z|$, the real component $Z'$, and the imaginary component $Z''$, even in different SOCs.

In the imaginary component $Z''$, however, data for SOC 10% has a part in which the data is significantly shifted from the straight line. In other words, in the imaginary component Z", an error that cannot be ignored possibly occurs according to measurement circumstances. Thus, in a situation in which only the absolute value |Z| and the real component Z' are sufficient for the value Z of the impedance to be calculated, the slope function may be derived only for at least one of the absolute value |Z| and the real component Z'; namely, the slope function may not be derived for the imaginary component Z".

In the examples illustrated in FIG. 5 to FIG. 7, the slope function is derived as the approximate straight line, which connects a plurality of points; however, the approximate straight line, i.e., the slope function, can be derived from a point if any of the slope A and the intercept B of the slope function is known. In other words, if the slope A or the intercept B of the slope function is known, it is not necessary to obtain the plurality of temperatures T0 and the plurality of values Z0 of the complex impedance. It is possible to derive the slope function only from a pair of the temperature T0 and the value Z0 of the complex impedance.

If the plurality of points are not used, it is considered that an influence of measurement errors may be increased in the measurement or obtainment of the complex impedances and the temperatures of the battery 10. Specifically, it is hardly possible to remove an influence of noise by using the plurality of points. Thus, if the slope function is derived from a point, the temperature at which the measurement accuracy is ensured may be used.

(4) Estimation of Battery Temperature

Figure 9:
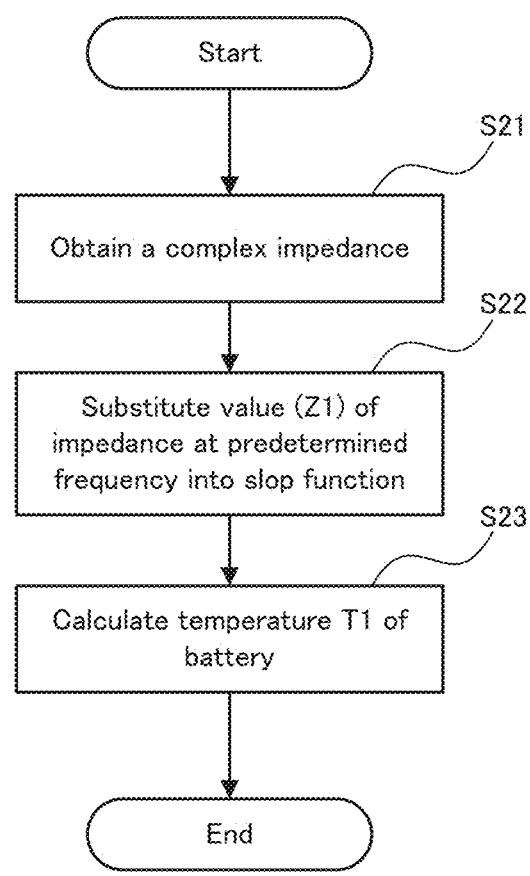
FIG. 9 is a flowchart illustrating a flow of a temperature estimation process performed by the temperature estimating apparatus according to the embodiment.

Next, a temperature estimation process, which is a process of estimating the temperature and which is performed by the temperature estimating apparatus 100 according to the embodiment, will be explained with reference to FIG. 9. FIG. 9 is a flowchart illustrating a flow of the temperature estimation process performed by the temperature estimating apparatus according to the embodiment.

In FIG. 4, the temperature estimating apparatus 100 according to the embodiment performs the process of estimating the temperature of the battery 10 by using the aforementioned slope function. Specifically, the impedance acquirer 100 firstly obtains complex impedances of the battery 10 (step S21). The complex impedances obtained here may be outputted to the temperature estimator 140.

The temperature estimator 140 substitutes a value (which will be hereinafter expressed as Z1) of a complex impedance at the predetermined frequency out of the obtained complex impedances, into the slope function derived in the process illustrated in FIG. 4 (step S22). In this manner, the temperature estimator 140 calculates a temperature T1 corresponding the value Z1 of the complex impedance (step S23). The estimated temperature T1 is a value corresponding to the value Z1 of the complex impedance. In other words, the temperature T1 is the temperature T of the battery 10 when the value Z1 of the complex impedance is obtained.

The aforementioned series of process operations is typically repeated with a predetermined period during running of the vehicle. In other words, the temperature T1 of the battery 10 is regularly estimated. The slope function used for the estimation does not change unless the configuration of the battery 10 changes. In other words, unless the battery 10 is replaced by a new one, the same slope function can be used to estimate the temperature T1 of the battery 10. Thus, once the slope function is derived, it is not necessary to derive a new slope function at each time.

If a plurality of temperatures T1 of a plurality of types of batteries 10 are estimated, a plurality of slope functions respectively corresponding to the plurality of types of batteries 10 may be used. In this case, the slope function may be newly derived in timing in which the type of the battery 10 is changed. Alternatively, the plurality of slope functions respectively corresponding to the plurality of types of batteries 10 may be derived and stored in advance, and a slope function that is to be used may be selected from them, as occasion demands.

In order to select the slope function that is to be used from the plurality of slope functions stored, the value Z of the complex impedance of the battery 10 may be measured under a temperature condition in which the measurement accuracy is ensured. The value Z of the complex impedance and the temperature T measured in this manner have high measurement accuracy and have accurate values. Thus, if a slope function that is established after the substitution of the values is found, it is possible to appropriately select the slope function to be used, i.e., the slope function corresponding to the battery 10 at that time.

(5) Technical Effect

As explained above, according to the temperature estimating apparatus in the embodiment, it is possible to estimate the temperature T of the battery 10, by using the slope function indicating the relation between the value Z of the complex impedance and the inverse of the temperature T.

In particular, the slope function used in the embodiment is a relatively simple function and thus can be easily derived. Moreover, when the slope function is used to estimate or calculate the temperature of the battery 10, the process may be simple. It is therefore possible to suppress cost of the apparatus and an increase in size, and the apparatus can be easily mounted even in a limited space, which is inside the vehicle.

<Supplementary Notes>

Various aspects of embodiments of the present disclosure derived from the embodiment explained above will be explained hereinafter.

(Supplementary Note 1)

A temperature estimating apparatus described in Supplementary Note 1 is provided with: a deriving device configured to derive a slope function, on the basis of a value of a complex impedance of a battery at a predetermined frequency out of values obtained at a plurality of different temperatures and on the basis of a temperature of the battery when the complex impedance is obtained, wherein the slope function indicates a relation between the value of the complex impedance at the predetermined frequency and an inverse of the temperature of the battery; and an estimator configured (i) to measure a value of the complex impedance at the predetermined frequency and (ii) to substitute the measured value of the complex impedance at the predetermined frequency into the slope function, thereby estimating a temperature of the battery when the value of the complex impedance is measured.

According to the temperature estimating apparatus described in Supplementary Note 1, the slope function may be derived on the basis of the value of the complex impedance of the battery at the predetermined frequency out of the values obtained at the plurality of different temperatures and on the basis of the temperature of the battery when the complex impedance is obtained. The slope function is derived as a function indicating the relation between the value of the complex impedance at the predetermined frequency and the inverse of the temperature of the battery. It is thus possible to estimate the temperature of the battery when the complex impedance is measured, from the value of the complex impedance at the predetermined frequency, by using the slope function. In other words, it is possible to estimate the temperature of the battery without using a temperature sensor, as long as the slope function is derived.

(Supplementary Note 2)

In a temperature estimating apparatus described in Supplementary Note 2, the deriving device is configured to use at least one of an absolute value and a real component of the complex impedance, as the value of the complex impedance at the predetermined frequency.

According to the temperature estimating apparatus described in Supplementary Note 2, by using at least one of the absolute value and the real component of the complex impedance, it is possible to estimate the temperature of the battery with relatively high accuracy, for example, in comparison with when an imaginary component of the complex impedance is used.

(Supplementary Note 3)

In a temperature estimating apparatus described in Supplementary Note 3, the slope function is expressed as a numerical expression, which is $\log Z = A \times (1/T) + B$, wherein A is a slope, B is an intercept, Z is the value of the complex impedance at the predetermined frequency, and T is the temperature of the battery.

According to the temperature estimating apparatus described in Supplementary Note 3, the slope function may be derived as a linear function. It is thus possible to extremely easily estimate the temperature of the battery.

(Supplementary Note 4)

In a temperature estimating apparatus described in Supplementary Note 4, if one of the slope A and the intercept B is known, said deriving device is configured to calculate another of the slope A and the intercept B, by using a temperature of the battery at which measurement accuracy is ensured and by using a value of the complex impedance at the predetermined frequency obtained at the temperature of the battery at which the measurement accuracy is ensured.

According to the temperature estimating apparatus described in Supplementary Note 4, it is possible to accurately calculate the slope A or the intercept B by using the temperature of the battery at which the measurement accuracy is ensured and by using the value of the complex impedance at the predetermined frequency obtained at the temperature at which the measurement accuracy is ensured.

(Supplementary Note 5)

In a temperature estimating apparatus described in Supplementary Note 5, the estimator is configured to store therein a plurality of slope functions respectively corresponding to a plurality of types of batteries, which are derived in advance by the deriving device, and the estimator is configured to determine the slope function that is used to estimate the temperature of the battery, from the plurality of slope functions stored, on the basis of a temperature at which measurement accuracy is ensured and on the basis of a value of the complex impedance at the predetermined frequency obtained at the temperature of the battery at which the measurement accuracy is ensured.

According to the temperature estimating apparatus described in Supplementary Note 5, an appropriate slope function according to the type of the battery whose temperature is to be estimated may be determined on the basis of the temperature at which the measurement accuracy is ensured and on the basis of the value of the complex impedance at the predetermined frequency obtained at the temperature of the battery at which the measurement accuracy is ensured. Thus, even if a plurality of types of batteries (or more specifically, a plurality of batteries in which different slope functions are derived) are targeted to estimate the complex impedances, it is possible to accurately estimate the temperatures of the batteries.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. A temperature estimating apparatus comprising one or more processors configured to:
    derive a slope function, based on a value of a complex impedance of a battery at a predetermined frequency out of values obtained at a plurality of different temperatures and based on a temperature of the battery when the complex impedance is obtained, wherein the slope function indicates a relation between the value of the complex impedance at the predetermined frequency and an inverse of the temperature of the battery;
    measure the value of the complex impedance at the predetermined frequency; and
    substitute the measured value of the complex impedance at the predetermined frequency into the slope function, thereby estimating a temperature of the battery when the measured value of the complex impedance is obtained,
    wherein the slope function is expressed as a numerical expression, which is $\log Z = A \times (1/T) + B$, wherein A is a slope, B is an intercept, Z is the value of the complex impedance at the predetermined frequency, and T is the temperature of the battery.

2. The temperature estimating apparatus according to claim 1, wherein said one or more processors are further configured to use at least one of an absolute value and a real component of the complex impedance, as the value of the complex impedance at the predetermined frequency in the slope function.

3. The temperature estimating apparatus according to claim 1, wherein if one of the slope A and the intercept B is known, said one or more processors are further configured to calculate another of the slope A and the intercept B, by using a temperature of the battery at which measurement accuracy is ensured and by using a value of the complex impedance at the predetermined frequency obtained at the temperature of the battery at which the measurement accuracy is ensured.

4. The temperature estimating apparatus according to claim 1, wherein the one or more processors are further configured to:
    store a plurality of slope functions respectively corresponding to a plurality of types of batteries, which are derived in advance by said one or more processors, and
    determine the slope function that is used to estimate the temperature of the battery, from the plurality of slope functions, based on a temperature at which measurement accuracy is ensured and based on a value of the complex impedance at the predetermined frequency obtained at the temperature of the battery at which the measurement accuracy is ensured.

* * * * *